United States Patent [19]

Kohri et al.

[11] Patent Number: 4,495,535
[45] Date of Patent: Jan. 22, 1985

[54] WHEEL-DRIVEN MODE SWITCHING MECHANISM FOR CASSETTE TAPE RECORDERS

[75] Inventors: Naomichi Kohri, Maebashi; Yutaka Fukuda; Hiroshi Muramatsu, both of Gunma, all of Japan

[73] Assignee: Victor Company of Japan, Japan

[21] Appl. No.: 333,981

[22] Filed: Dec. 23, 1981

[30] Foreign Application Priority Data

| Dec. 24, 1980 | [JP] | Japan | 55-186227[U] |
| Dec. 24, 1980 | [JP] | Japan | 55-186228[U] |
| Jan. 6, 1981 | [JP] | Japan | 56-622 |
| Jan. 21, 1981 | [JP] | Japan | 56-7337 |
| Jan. 23, 1981 | [JP] | Japan | 56-8644 |

[51] Int. Cl.$^3$ .............. G11B 15/00; G11B 17/00; G11B 15/12
[52] U.S. Cl. .................. 360/96.3; 360/137; 360/61
[58] Field of Search ............ 360/137, 74.1, 60-62, 360/73, 96, 96.3; 242/197-200

[56] References Cited

U.S. PATENT DOCUMENTS

| 4,214,283 | 7/1980 | Fushimi et al. | 360/74.2 X |
| 4,219,852 | 8/1980 | Magata et al. | 360/105 X |
| 4,225,894 | 9/1980 | Fulukawa et al. | 360/137 |
| 4,336,560 | 6/1982 | Matsumoto . | |
| 4,360,846 | 11/1982 | Asai et al. | 360/137 |

FOREIGN PATENT DOCUMENTS 2840067 3/1979 Fed. Rep. of Germany .
1192053 5/1970 United Kingdom .
2003646 3/1979 United Kingdom .
2005895 4/1979 United Kingdom .
2013017 8/1979 United Kingdom .
2029998 3/1980 United Kingdom .
2072918 10/1981 United Kingdom .
2077020 12/1981 United Kingdom .

Primary Examiner—Aristotelis M. Psitos
Attorney, Agent, or Firm—Lowe, King, Price & Becker

[57] ABSTRACT

A mode switching mechanism comprises a driving toothed wheel driven by a motor, a driven wheel having first and second coaxially mounted cams for rotation therewith, a toothed circumferential portion for providing meshing contact with the driving wheel and a toothless circumferential portion for providing out of meshing contact with the driving wheel. The driven wheel is normally urged so that it comes into meshing contact with the driving wheel. A spring-biased rotatable trigger lever is arranged to lock the driven wheel in a position out of meshing contact with the driving wheel and unlock it in response to the operation of any one of tape operating mode keys to establish the meshing contact to thereby allow the driven wheel to be rotated by the driving wheel. A a first cam follower is movable to a recording/playback position by camming contact with the second cam in response to the operation of one of the recording and playback mode keys, and a second cam follower is movable to a rewind/fast-forward position by camming contact with the second cam in response to the operation of one of the rewind and fast-forward mode keys.

12 Claims, 31 Drawing Figures

WHEEL-DRIVEN MODE SWITCHING MECHANISM FOR CASSETTE TAPE RECORDERS

BACKGROUND OF THE INVENTION

The present invention relates generally to cassette tape recorders, and in particular to a mode switching mechanism comprising wheel-driven cam followers for effecting various operational modes.

Mechanically operated mode switching mechanisms have been extensively used in cassette tape recording and reproducing apparatus. Although a relatively simple design satisfies the various mode switching functions, a large amount of force is required for operating each function key. This is particularly disadvantageous when the tape recorder is frequently switched between different modes or more than one function key is operated to effect cueing, review or automatic inter-feature scanning.

To overcome this problem, solenoid operated mode switching mechanisms have been developed as typically shown and described in U.S. patent application Ser. No. 134,990 filed Mar. 28, 1980 now U.S. Pat. No. 4,336,560 and assigned to the same assignee as the present invention. However, shortcomings inherent in the solenoid operated mechanism are relatively large amount of power consumption which is not suited for battery-operated cassette tape recorders, and a large number of component parts which makes it difficult to provide a recorder of moderate cost.

SUMMARY OF THE INVENTION

Accordingly, the primary object of the present invention is to provide an inexpensive and reliable mode switching mechanism in which each function key permits a "featherly" touch finger operation.

This object is achieved by separating the operational functions into first and second groups respectively actuated by first and second cam followers in selective contact with a cam driven by a motor-driven wheel.

The mode switching mechanism of the invention comprises a driving toothed wheel driven by the motor, a driven wheel having first and second coaxially mounted cams for rotation therewith, a toothed circumferential portion for providing meshing contact with the driving wheel and a toothless circumferential portion for providing out of meshing contact with the driving wheel, and biasing means in camming contact with the first cam for urging the driven wheel in a direction to cause it to come into meshing contact with the driving wheel. The mode switching mechanism further includes a spring-biased rotatable trigger lever arranged to lock the driven wheel in a position out of meshing contact with the driving wheel and arranged to unlock it in response to operation of any one of the mode keys to establish the meshing contact to thereby allow the driven wheel to be rotated by the driving wheel. A first cam follower is movable from a retracted position to an operative or recording/playback position by camming contact with the second cam in response to the operation of one of the recording and playback mode keys, and a second cam follower is movable to a rewind/fast-forward position by camming contact with the second cam in response to the operation of one of the rewind and fast-forward mode keys.

Record and playback operations are thus controlled by the first cam follower moving in response to an associated key by camming engagement with the second cam upon rotation of the driven wheel, while rewind and fast-forward operations are controlled by the second cam follower moving in response to an associated key by camming contact with the second cam. Since the power required to operate the first and second cam followers are supplied from the motor, and since each cam follower is only required to cooperate with a separate element, the power needed to operate each cam follower and hence each function key is significantly reduced.

Preferably, each of the first and second cam followers is formed with a notch with which a spring-biased lock means, or pin engages when the first and second cam followers are moved independently of each other to the respective operative positions. Each of the notches is shaped such that the lock pin is engageable only with the notch of the first cam follower when the second cam follower is moved to the rewind/fast-forward position subsequent to the movement of the first cam follower to the record/playback position and engageable with both of the notches when the first and second cam followers are simultaneously moved to the respective operative positions.

A further feature of the invention is the provision of a separate release mechanism which includes a second driven wheel having a third coaxially mounted cam rotatable therewith. A toothed circumferential portion of the second driven wheel provides meshing contact with the driving wheel while a toothless circumferential portion thereof provides out of meshing contact with the driving wheel. A first spring-biased rotatable member is in camming contact at one end thereof with the third cam to urge the second driven wheel in a direction to mesh with the driving wheel. The first spring biased rotatable member is arranged to be rotatable in opposite directions by camming contact with the third cam when the second driven wheel rotates. A second spring-biased member is rotatably mounted on the the other end of first rotatable member and includes first and second recesses located at different distances from the center of rotation of the second rotatable member for selective engagement with the spring biased lock pin so that the latter moves different distances depending on which one of the recesses it engages. Further included is a second spring-biased rotatable trigger lever arranged to lock the second driven wheel in a position out of meshing contact with the driving wheel and arranged to unlock it in response to operation of the stop key of the tape recorder to establish the meshing contact to thereby allow the second driven wheel to be rotated by the driving wheel. The notches of the cam followers have camming contact edges of different lengths so that upon rotation of the second driven wheel the lock pin is moved in a direction away from the first and second cam followers along the camming contact edges to selectively cause the first and second cam followers to return to inoperative positions.

DETAILED DESCRIPTION

Figure 1:
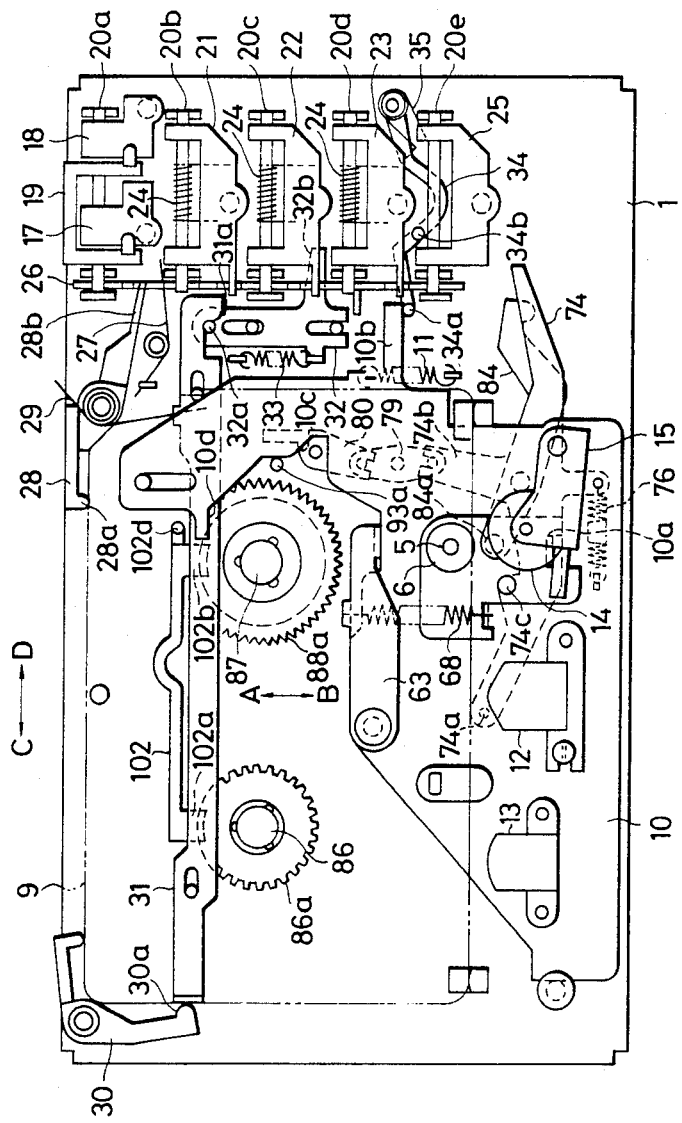
FIG. 1 is a plan view of the mode switching mechanism of the invention in a step position.
Figure 2:
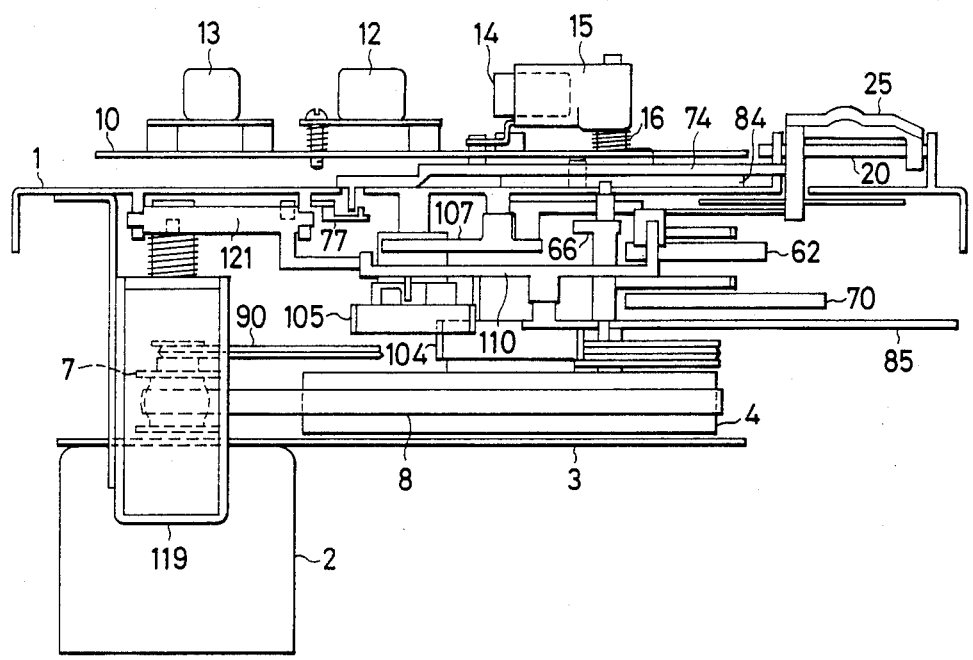
FIG. 2 is a front view of the mechanism of FIG. 1.
Figure 3:
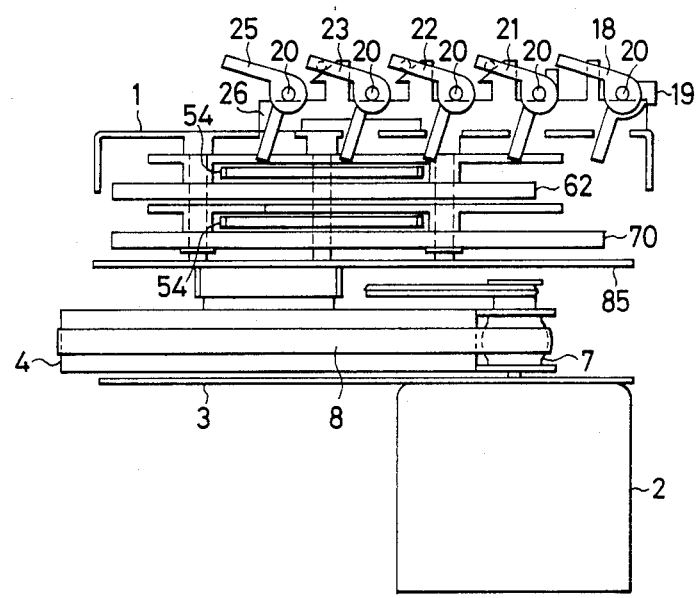
FIG. 3 is a side view of the mechanism of FIG. 1 as seen from the right.

Referring to FIGS. 1 to 3, there is shown a preferred embodiment of a wheel-driven mode switching mechanism of the invention. The mode switching mechanism of the invention can be adapted for use with cassette tape recording and reproducing apparatus including a plurality of mode selecting function keys and associated component parts which are not shown for simplicity. The mechanism includes a main chassis 1 formed of plastic. A motor 2 having a pulley 7 is secured beneath chassis 1 by a fixing member 3 to drive a flywheel 4 to which a capstan 5 is coaxially mounted. Capstan 5 is mounted on a bearing above main chassis 1 and driven by a capstan belt 8 looped around pulley 7 and flywheel 4.

A slide base 10 on which a recording/playback head 12 and an erase head 13 are mounted is supported on the chassis for movement in directions A and B and is normally urged by a restoring spring 11 in direction B.

A pinch roller 14 is rotatably mounted on a pivot arm 15 urged in a clockwise direction by a spring 16. In a stop position, the pinch roller arm 16 is in contact with a lug 10a of slide base 10.

REWIND lever 17 and FAST-FORWARD lever 18 are pivotally mounted on a shaft 20a on which a lever 19 is also pivotally mounted for unitary movement with each of the REWIND and FAST-FORWARD levers. PLAYBACK lever 21, STOP lever 22, RECORD lever 23 and PAUSE lever 25 are respectively pivotally mounted on shafts 20b, 20c and 20d. Each of these mode selecting levers is normally urged in clockwise direction (as seen in FIG. 3) by a spring 24 and arranged so that they move to a downward position when depressed by individual manually operated function keys, not shown, mounted a control panel. A latch bar 26 is movably mounted on the chassis in directions A and B and normally biased in direction B by a restoring spring 27 to engage PLAYBACK and RECORD levers 21 and 23 in a locked position disengaging when STOP lever 22 is operated or when kicked off by a projection 10b of slide base 10 during the record or playback mode. A cassette lever 28 is pivotally mounted on chassis 1 and normally urged in a counterclockwise direction by a spring 29. Lever 28 is formed with a projection 28a to detect when a tape cassette 9 is placed in position and an opposite extension arm 28b is engageable with latch bar 26. A bell crank 30 is pivotally mounted on the main chassis to detect the presence of the plastic tab which is manually detached from the cassette when it contains recorded material in order to prevent erasure. Bell crank 30 is formed with a projection 30a in contact with the left end of a latch bar 31 movable in directions C and D and normally urged in direction C by a return spring 29. Bar 31 is formed with a cam portion 31a at the right end thereof.

A record mode inhibit member 32 having a pin 32a and an extension arm 32b is normally urged in direction A by a spring 33 so that pin 32a engages cam portion 31a of latch bar 31 and extension arm 32b engages RECORD lever 23 to limit downward movement of the record lever. A record inhibit lever 34 having a projection 34a is pivotally mounted below RECORD lever 23 and normally urged in a clockwise direction by a spring 35 so that projection 34a is in contact with a projection 10b of slide base 10. Record inhibit lever 34 prevents or permits downward movement of RECORD lever 23 depending on its angular position.

Figure 4:
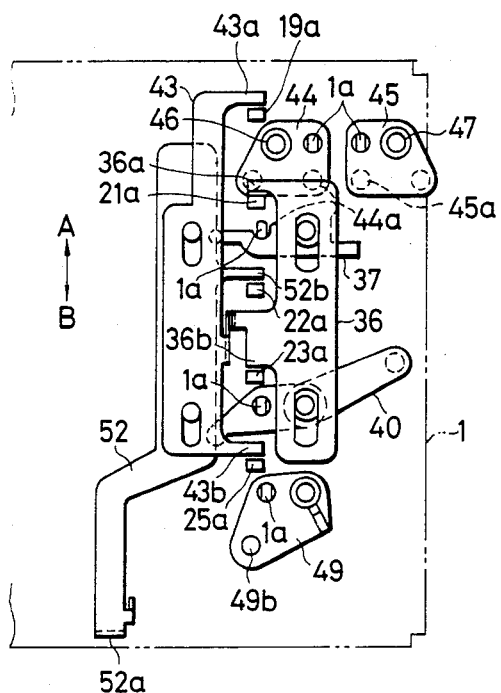
FIG. 4 is a partial plan view of a key-operated control section of the mode switching mechanism.
Figure 5:
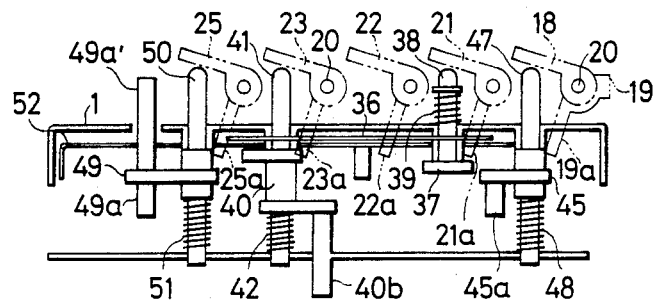
FIG. 5 is a side view of the control section of FIG. 4 as seen from the right.

Referring now to FIGS. 4 and 5, the key-operated component parts of the mechanism are illustrated in more detail. In FIG. 4, a first key-operated control plate 36 is slidably mounted on main chassis 1 to move in directions A and B and is formed with contact portions 36a and 36b which are respectively engageable with legs 23a and 25a of the RECORD and PAUSE levers. As shown in FIG. 5 each of the mode selecting levers is formed with a leg designated by a subscript "a" which extends downwardly through a respective hole in main chassis 1. A playback elevating lever 37 is mounted on a vertically movable pivot shaft 38 which, normally urged upward by a spring 39, moves downward in response to PLAYBACK lever 21 being depressed. A record elevating lever 40 is secured to a vertically movable pivot shaft 41 which, normally urged upward by a spring 42, is moved downward in response to operation of RECORD lever 23. A second key-operated control plate 43 is mounted on main chassis 1 to slide in directions A and B and is formed with rightwardly extending portions 43a and 43b which are respectively engageable with legs 19a and 25a of linkage lever 19 and PAUSE lever 25. A rewind elevating lever 44 and fast-forward elevating lever 45 are secured respectively to vertically movable pivot shafts 46 and 47 which, normally urged upward by springs 48, are respectively moved downward in response to depressing REWIND lever 17 and FAST-FORWARD lever 18. A pause elevating lever 49 is also secured to a vertically movable pivot shaft 50 which, normally urged upward by a spring 51, is moved with PAUSE lever 23.

A third key-operated control plate 52 is mounted below and slidably movable with respect to second key-operated control plate 43. Plate 52 is formed with a projection 52b engageable with leg 22a of STOP lever 22.

Figure 6:
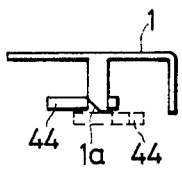
FIG. 6 is a view illustrating the rewind elevating lever in different operating positions.

Main chassis 1 is formed with a plurality of downwardly projecting cam portions 1a each of which normally engages a recess provided with in a respective one of the elevating levers. As illustrated in FIG. 6, rewind elevating lever 44, for example, is shown located in an upward position indicated by a solid line with associated cam portion 1a being received in the recess. When lever 44 is moved to a pivotally displaced downward position as indicated by broken lines, cam portion 1a is disengaged from the recess and lever 44 is held against the lowermost end of cam portion by the spring 48.

The mode switching mechanism comprises a first and a second drive system each having a respective cam follower movably mounted below the main chassis in a mutually overlying relationship.

Figure 7:
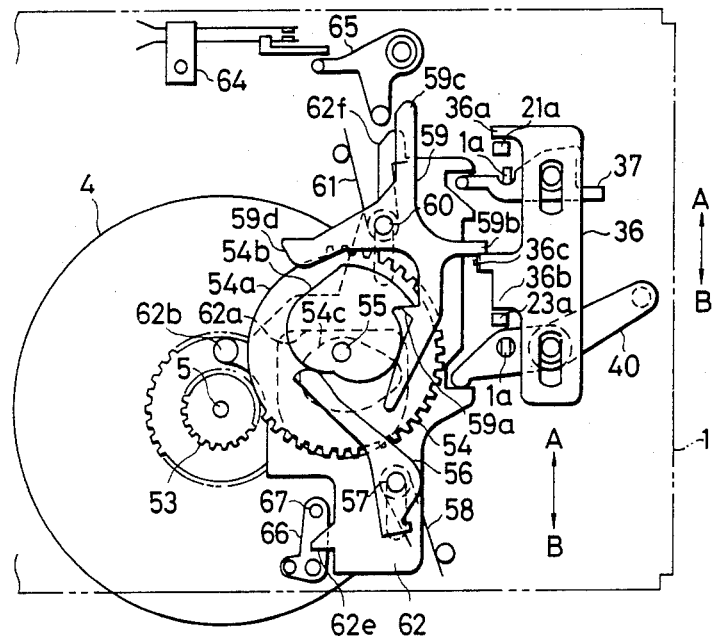
FIG. 7 is a plan view of a first drive system of the mechanism including the first cam follower.
Figure 8A:
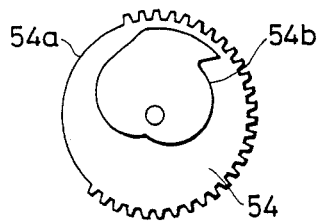
FIGS. 8a and 8b are illustrations of the first control wheel.
Figure 8B:
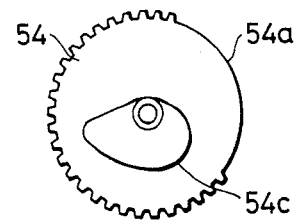

The first drive system is shown in FIG. 7 and comprises a first driving toothed wheel 53 coaxially fixed to capstan 5 above flywheel 4 and driven by motor 2 when energized. A first control, or driven wheel 54 is rotatably mounted on a pivot shaft 55. Driven wheel 54 is formed with a toothed circumferential portion adapted to mesh with driving wheel 53 and a toothless circumferential portion 54a providing out of mesh contact with the driving wheel. Driven wheel 54 further includes coaxially mounted cams 54b and 54c on upper and lower surfaces thereof, respectively, as illustrated in FIGS. 8a and 8b.

A first kickoff lever 56 rotatably mounted on a pivot shaft 57 is normally urged in a clockwise direction by a spring 58 so that the distal end thereof engages upper side cam 54b to impart a clockwise rotative thrust to first driven wheel 54 which then engages driving wheel 53. A first trigger level 59 rotatably mounted on a pivot shaft 60 is normally urged clockwise by a spring 61. Trigger lever 59 is formed with a hook 59a normally engaging upper cam 54b to prevent clockwise rotation of first driven wheel 54 and is further formed with a rightwardly extending arm 59b normally engaging with a projection 36c of first control plate 36.

Figure 9:
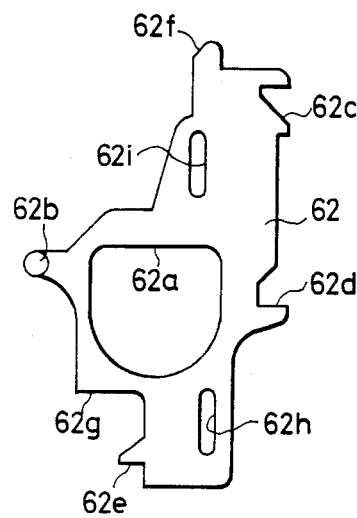
FIG. 9 is an illustration of the first cam follower.

In FIG. 9, a first cam follower 62 is mounted on main chassis 1 for movement in directions A and B between a retracted position and a record/playback position defined by shafts 57 and 60 extending respectively through guide slots 62h and 62i. Cam follower 62 is formed with an opening 62a defining a camming contact edge to engage lower side cam 54c by which the first cam follower is moved to the record/playback position.

Figure 11:
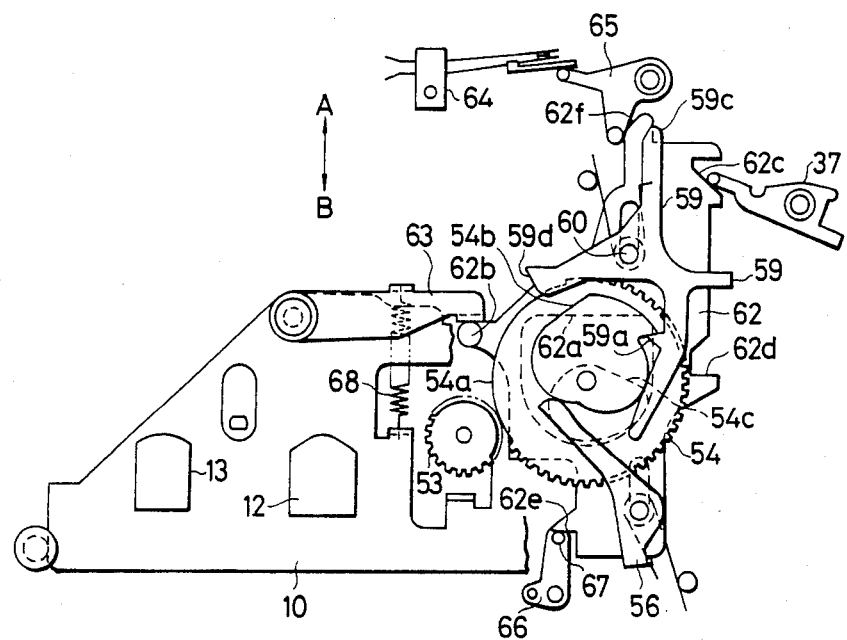
FIG. 11 is a plan view of the first drive system operating in playback mode.
Figure 12:
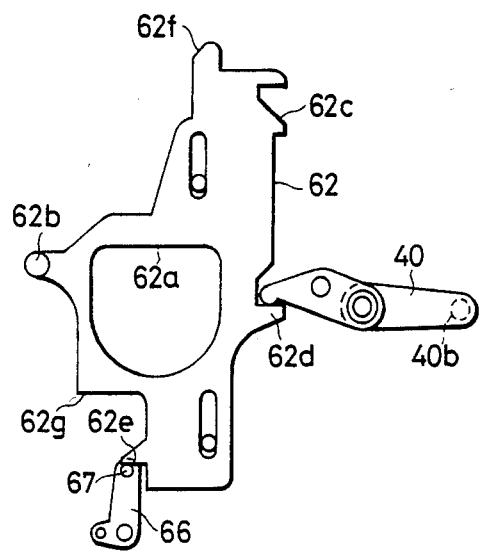
FIG. 12 is an illustration of the first cam follower in a recording mode.

The first cam follower 62 is formed with a leftward extending projection 62b engageable with a playback-mode pivotally movable arm 63 (FIG. 11) and projections 62c and 62d on the right side thereof are respectively engageable with playback mode elevating lever 37 and record mode elevating lever 40 (see FIGS. 7, 11 and 12).

Figure 10:
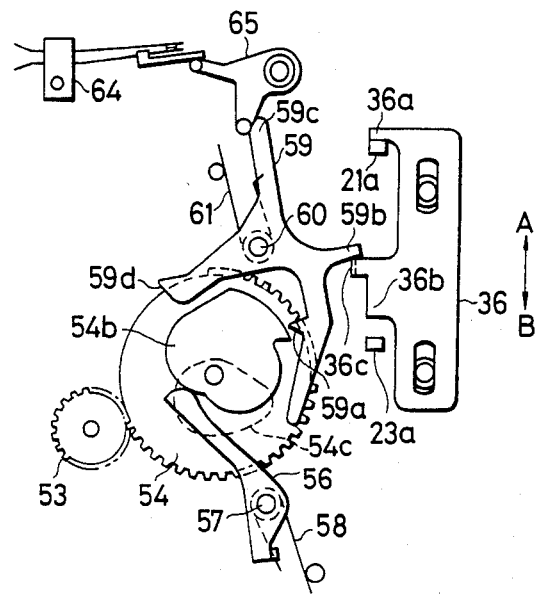
FIG. 10 is a plan view of the first drive system shown in a starting position.

A motor power switch 64 mounted on the underside of main chassis 1 operates in response to pivotal movement of a bell crank 65 when the latter selectively engages an arm 59c of trigger lever 59 or a cam portion 62f of cam follower 62 when the latter moves in direction A (see FIGS. 10 and 11). A spring-biased lock lever 66 having a lock pin 67 is mounted on main chassis 1 to engage with a notch 62e of the first cam follower 62, locking the latter in an operative position when moved in direction A (see FIGS. 7 and 11). When PLAYBACK lever 21 moves to the downward position in response to operation of the associated manually operated key (not shown), first control plate 36 moves in direction A by engagement with leg 21a of lever 21 and playback elevating lever 37 descends (FIGS. 4 and 5).

FIG. 10 is an illustration of the starting position of the first drive system of mechanism. Upon the movement of first control plate 36, first trigger lever 59 rotates counterclockwise against spring 61 by means of projection 36c to disengage pawl 59a from contact with cam 54b to allowing control wheel 54 to rotate clockwise under thrust provided by first kickoff lever 56, causing wheel 54 to mesh with first toothed wheel 53.

Upon counterclockwise rotation of first trigger lever 59, switch oprerating lever 65 rotates clockwise via engagement with arm portion 59c closing the contacts of motor switch 64 to energize motor 2 causing first drive wheel 53 to rotate counterclockwise. As a result, first control wheel 54 turns clockwise and first cam follower 62 moves in direction A via camming engagement with lower side cam 54c causing left pin 62b to engage playback arm 63 to pull slide base 10 via a spring 68 in direction A, whereby first cam follower 62 is locked in position by the lock pin 67 as illustrated in FIG. 11 in which playback head 12 is brought into contact with a cassette tape for playback operation. In the FIG. 11 position, cam portion 62f engages switch operating lever 65 instead of extension arm 59c to maintain motor power switch 64 in the ON state.

After completing a revolution of 360 degrees, control wheel 54 disengages from meshing contact with drive wheel 53 and comes into locking engagement with hook 59a.

Playback mode elevating lever 21, now in the downward position, rotates clockwise via engagement with notch 62c to prevent the playback mode from changing to the stop mode as will be described later.

PLAYBACK lever 21, although moved to a locked position by engagement with latch bar 26 (shown in FIGS. 1 and 3), is unlocked into the original position when slide base 10 is moved to the playback mode position. First control plate 36 is also returned to the original position.

When RECORD lever 23 moves downward in response to operation of the record key, control plate 36 now moves via engagement with the arm 23a causing a series of events to occur in the same manner as in playback mode so that cam follower 62 is moved to the operative position. However, since record elevating lever 40 moves to the downward position, it engages projection 62d of cam follower 62 and is rotated clockwise as shown in FIG. 12. Pin 40b of lever 40 now operates a record-playback changeover switch, not shown, to the recording position.

Operation of RECORD lever 23 is allowed only when sensing lever 30 is rotated counterclockwise if cassette 9 includes the record tab moving linkage bar 31 in direction D to allow record inhibit plate 32 to move in direction A via opening 33, as shown in FIG. 1. However, if cassette 9 lacks record tab, the linkage bar 31 moves in direction C so that end portion 31a engages pin 32a of inhibit plate 32 to move it in direction B to, preventing RECORD lever 23 from moving downward by extension arm 32b.

When cassette 9 is placed in position, cassette sensing lever 28 turns clockwise to disengage from latch bar 26 and allow RECORD lever 23 to be locked in position. In the absence of cassette 9, the sensing lever 28 is turned counterclockwise by spring 29 moving the latch bar 26 in direction B to prevent the RECORD lever 23 from being locked.

If cassettes are interchanged after RECORD lever 23 is locked in position, cassette sensing lever 28 unlocks lever 23 to prevent inadvertent erasure of recorded materials.

RECORD lever 23 is further prevented from being operated during playback mode by record inhibit lever 34 as it comes to a position directly below it by spring 35 due to displacement of projection 10b of slide base 10 to the playback position.

By locking either the PLAYBACK or RECORD lever and setting a timer, it is possible to automatically energize the recorder at a desired time to operate on the specified mode. For example, with PLAYBACK lever 21 being locked, the first drive system of the cassette recorder stays in the position of FIG. 10 ready to start operating on the playback mode in response to energization of the recorder by the timer.

Figure 13:
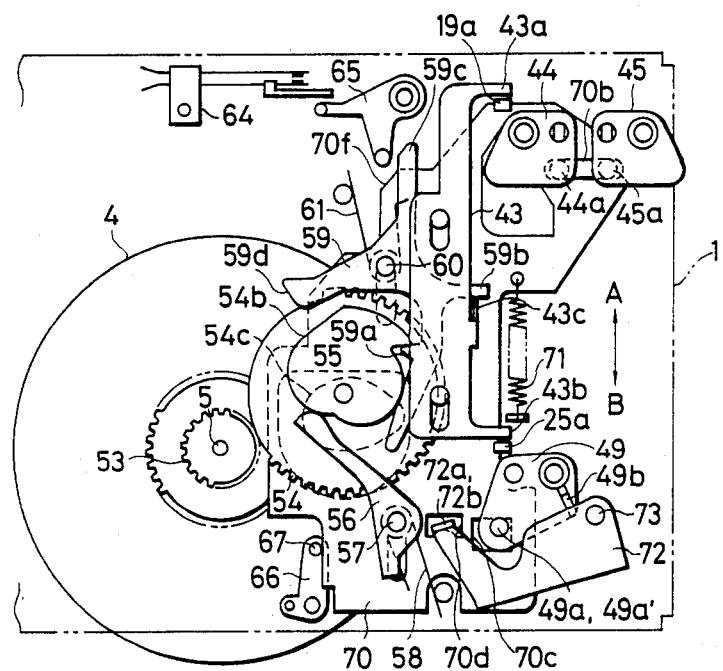
FIG. 13 is a plan view of a second drive system of the mechanism including a second cam follower which is driven by camming contact with the same control wheel of the first drive system.

FIG. 13 is an illustration of a second drive system of the tape recorder mechanism in an inoperative position.

The second drive system is located below the first drive system and commonly uses the parts of the first drive system which are indicated by the same numerals.

Figure 14:
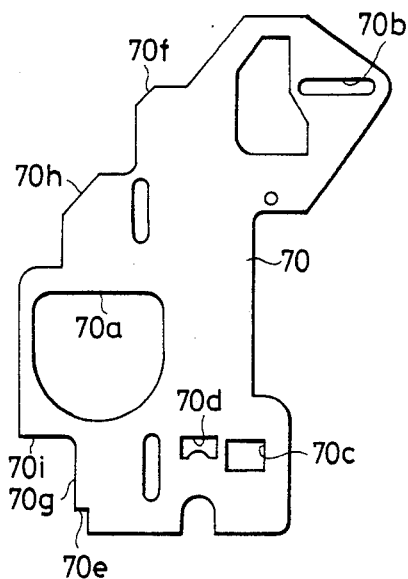
FIG. 14 is an illustration of the second cam follower.

A second cam follower 70 shown in FIG. 14 is movably supported in directions A and B by shafts 57 and 60 and normally urged by a spring 71 in direction B. Follower 70 is formed with an opening 70a which makes a camming contact with lower side cam 54c of control wheel 54 so that the second cam follower moves in direction A to a rewind/fast-forward position. Second cam follower 70 is also formed with an elongated opening 70b which receives downwardly extending pins 44a and 45a of rewind mode elevating lever 44 and fast-forward mode elevating lever 45. An opening 70c in follower 70 receives a downwardly extending pin 49a of pause mode elevating lever 49.

Figure 15:
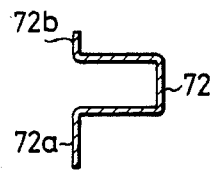
FIG. 15 is a cross-sectional view of the REVIEW lever.

A REVIEW lever 72 having a channelled structure as shown in FIG. 15 is pivotally and vertically movably supported on a shaft 73 to accomodate between side walls thereof a rib portion 49b of pause elevating lever 49 so that the latter is vertically movable with the REVIEW lever 72. REVIEW lever includes a lower hook portion 72a which engages an opening 70d of second cam follower 70 and an upper hook 72b used to provide review and cueing operations described below. Switch operating lever 65 is additionally engageable with a notch 70e of second cam follower 70 when the latter is moved and locked in operative position by lock pin 67 in the same manner as the first cam follower 62 is locked.

When REWIND lever 17 moves to the downward position in response to the operation of the associated manual key, not shown, rewind elevating lever 44 moves downward against spring 48 (see FIG. 5), while second control plate 43 is moved in direction A via engagement with leg 19a of linkage lever 19 which is moved with the REWIND lever.

Figure 16:
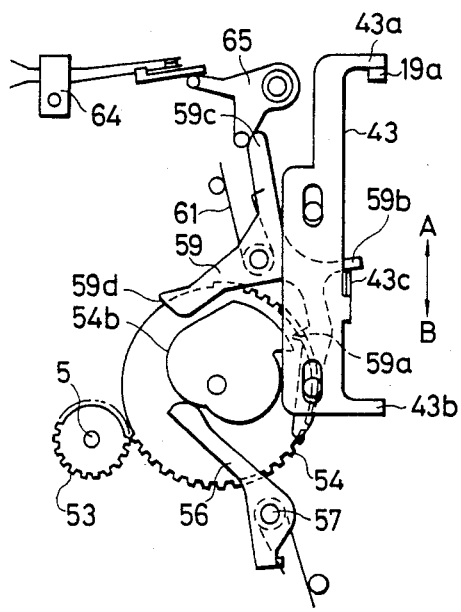
FIG. 16 is a plan view of the second drive system in a starting position.

FIG. 16 is an illustration of the second drive system in a starting position in which trigger lever 59 is rotated counterclockwise by engagement with right side projection 43c of second control plate 43 and control wheel 54 is disengaged from contact with the hook 59a to start rotating clockwise by thrust given by the kickoff lever 56 to mesh with drive wheel 53.

Switch operating lever 65 is rotates clockwise via engagement with trigger lever 59 to energize the motor 2 followed by rotation of control wheel 54 causing lower side cam 54c to move second cam follower 70 in direction A.

Figure 17:
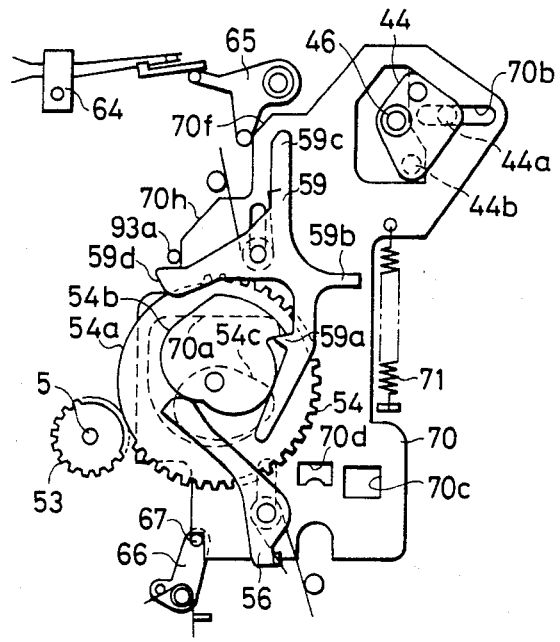
FIG. 17 is a plan view of the second drive system operating in rewind mode.

FIG. 17 is an illustration of the rewind mode of the second drive system in which second cam follower 70 is locked in the rewind/fast-forward position by engagement with lock pin 67 and rewind-mode elevating lever 44 rotates counterclockwise due to engagement of lower pin 44a with opening 70b. Rewind elevating lever 44 is further provided with a downwardly extending pin 44b used for the rewinding operation to be described. Switch operating lever 65 is maintained in the operating position by follower 70 until control wheel 54 completes a 360-degree revolution as described above. With REWIND lever 17 being returned to the inoperative position, rewind elevating lever 44 is held in the operating position to continue the rewinding operation. When FAST-FORWARD lever 18 is operated, the second drive system operates in the same manner just described.

Figure 18:
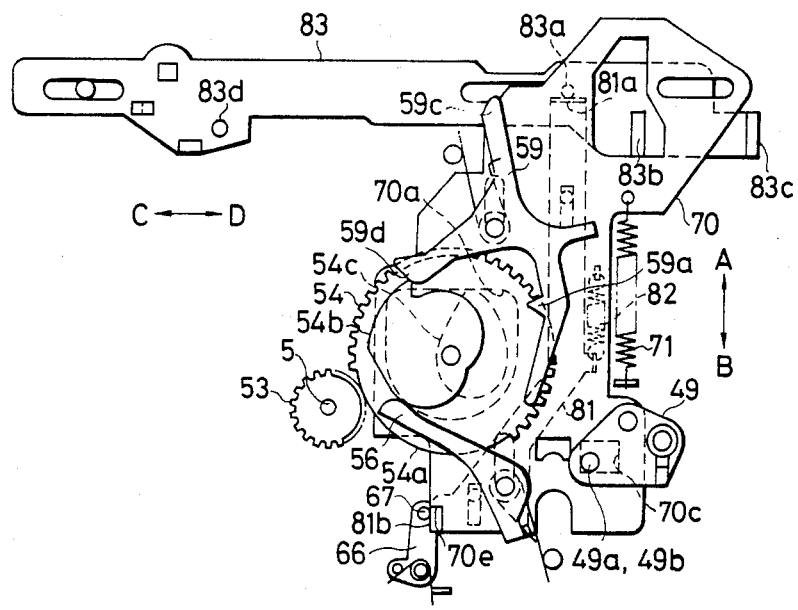
FIGS. 18 and 19 are plan views of the second drive system in a pause mode position.

FIG. 18 is an illustration of the pause mode of the second drive system. Upon depressing a pause key, not shown, PAUSE lever 25 and pause elevating lever 49 move downward causing leg 25a to move second control plate 43 in direction A (see FIG. 13) moving second cam follower 70 in the same direction.

As a result, the pause mode elevating lever 49 is turned clockwise by engagement of pin 49a thereof with opening 70c to effect a pause mode via an upper pin 49a'.

Figure 19:
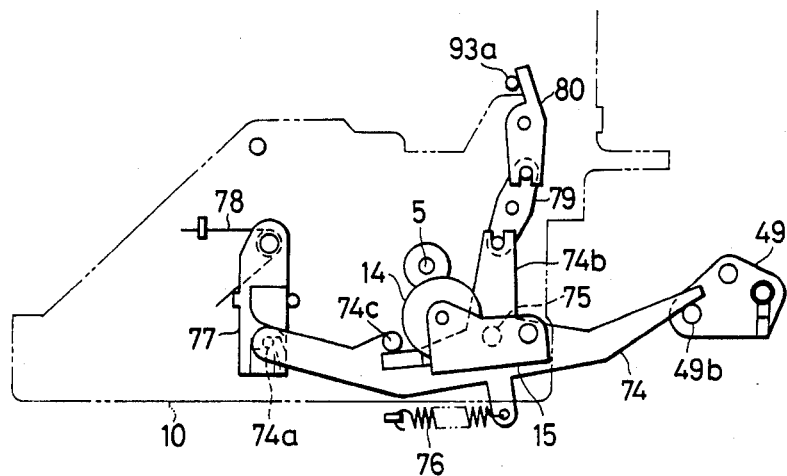

In FIG. 19, the mechanism further includes a pause shift bell crank 74 pivotally supported on a shaft 75 secured to main chassis 1 and urged clockwise by a spring 76. Crank 74 includes a pin 74a on a left arm thereof engaged with a known lock mechanism of the push-on push-off type comprising a lock arm 77 and a spring 78 having dual functions of restoration and compression of lock arm 77. The bell crank 74 has a center arm 74b coupled through a pivot member 79 with an eject lever 80 which operates to cut off rotative power to the takeup reel in a manner as will be described. When pause mode elevating lever 49 is turned counterclockwise causing upper pin 49a' thereof to rotate pause shift bell crank 74 in a counterclockwise direction against spring 76 as illustrated, pin 74c causes pinch roller arm 15 to rotate counterclockwise about its pivot to disengage pinch roller 14 from contact with capstan 5.

Figure 20:
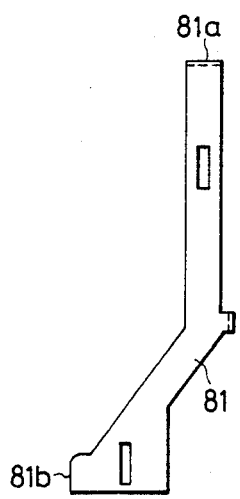
FIG. 20 is an illustration of a lock member of the second drive system.

The pause shift bell crank 74 is locked and unlocked by the known lock mechanism so that during the pause mode it is necessary to inhibit lock pin 67 from locking second cam follower 72. For this purpose, cam follower 70 is provided on an underside thereof with a lock control plate 81, shown in FIG. 20, which is movable in directions A and B and normally biased in direction B by a spring 82 so that the lock control plate is normally movable with the second cam follower.

A reel disk drive member 83, shown in FIG. 18, is supported movably in directions C and D. Member 83 moves in direction D during the rewind mode and in direction C during the fast-forward mode and remains in the neutral position during any other operational mode as illustrated. On the upper side of reel disk drive member 83 is a pin 83a which, in the FIG. 18 position, engages a hook end 81a of lock control member 81 to cause the latter to displace in direction B against spring 82 so that a hook end 81b of the lock control member is positioned to cover cam portion 70e of second cam follower 70 to prevent lock pin 67 from engaging it.

During the rewind or fast-forward mode, lock control member 81 disengages from contact with pin 83a allowing cam portion 70e to engage the lock pin 67.

When PAUSE lever 25 is depressed, the trigger lever 59 rotates counterclockwise causing control wheel 54 to start rotating so that lower side cam 54c provides camming contact with second cam follower 70 to move it in direction A until the control wheel turns to a position where it disengages from meshing contact with drive wheel 53. In this position, upper side cam 54b comes into engagement with an arm portion 59d of trigger lever 59.

Since pause shift bell crank 74 is locked by lock arm 77 as illustrated in FIG. 19, the pause mode is maintained even after the PAUSE lever is released. On the other hand, control wheel 54 disengages from contact with trigger lever 59 and rotates clockwise via kickoff lever 56 to return to the position of FIG. 13.

Figure 21:
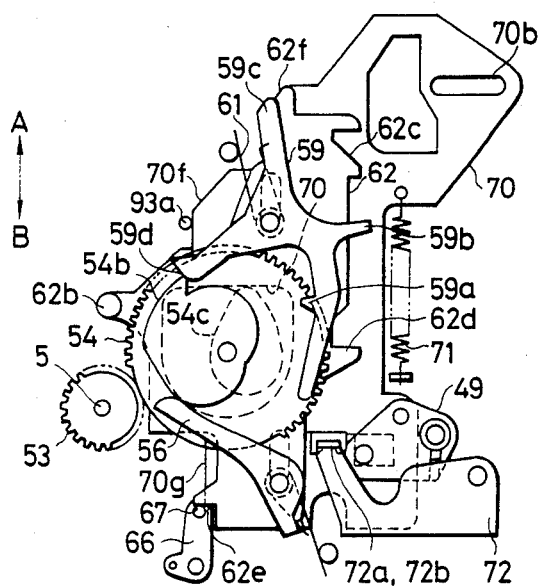
FIG. 21 is a plan view of the second drive system in a review mode position.

When REWIND lever 17 is operated during playback mode for manual "review" in search of a desired inter-feature period, trigger lever 59 rotates counterclockwise to cause first control wheel 54 to complete a 270-degree rotation from its starting position of FIG. 16. Arm 59d engages wheel 54. Second cam follower 70 is moved by cam 54c against spring 71 to the position indicated in FIG. 21 to drive the reel driven mechanism to be described at rewind speed. During playback mode, since lock pin 67 is in contact with a side cam edge 70g of second cam follower 70 while it locks first cam follower 62 under a combined force of springs 11 and 16, the second cam follower remains unlocked by pin 67 when moved subsequently in response to operation of the REWIND lever. For this reason, when REWIND lever is released, trigger lever 59 is returned to the original position by spring 69 causing first control wheel 54 to be unlocked to return to the starting position of FIG. 13.

Figure 22:
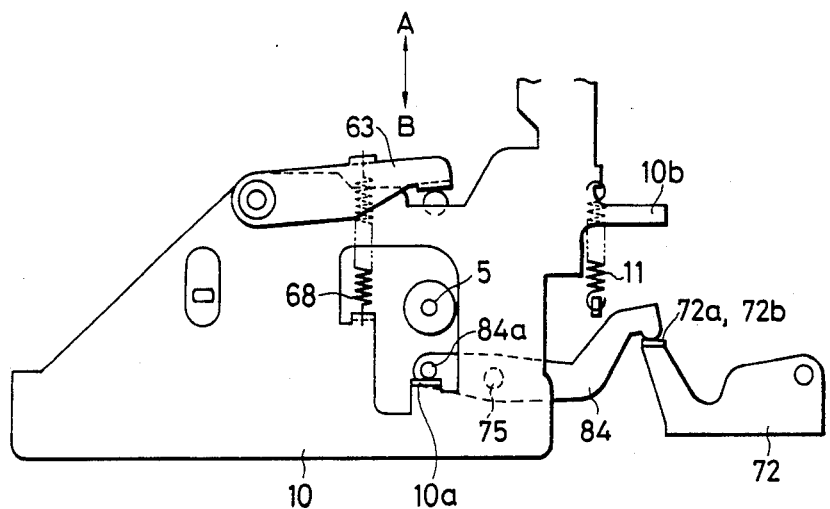
FIG. 22 is a plan view of a part of the second drive system in a review mode position.

In FIG. 22, a review shift bell crank 84 is shown pivotally mounted on a shaft 75 secured to main chassis 1. Crank 84 has a left side pin 84a contacting lug 10a of slide base 10. Being vertically movable with pause elevating lever 49, REVIEW lever 72 is in an upward position during the pause mode of FIG. 21 so that upper hook end 72b is in contact with review shift bell crank 84 causing the latter to rotate counterclockwise slide base 10 moves in direction B against spring 68 by engagement between pin 84a of bell crank 84 and lug 10a of the slide base, whereby the transducer heads are displaced slightly from the normal tape contact position. On the other hand, the rotary torque applied to the takeup wheel is disconnected by cam portion 70f of second cam follower 70 in a manner as will be described. During the review mode, the REWIND lever is kept manually operated until a desired inter-feature period on tape is audibly sensed in a well known manner.

Cueing operation is effected in the same manner just described if FAST-FORWARD lever 18 remains manually depressed with the PLAYBACK lever.

Automatic inter-feature scanning is effected by simultaneously operating PLAYBACK lever 21 and one of REWIND and FAST-FORWARD levers 17, 18 during which a known detector, not shown, senses an inter-feature period between recorded features to stop the mechanism to play a desired music program. In response to simultaneous operation of the PLAYBACK and REWIND levers, a similar series of events occurs to that described in connection with the review mode with the exception that first and second cam followers 62, 70 are simultaneously moved in direction A and locked in place by lock pin 67 engaging notches 62e and 70e. It will be noted that in the automatic scan mode, lock pin 67 is located at the corner of notch 62e which is sightly clockwise from the position of FIG. 21. Due to the difference in the position of lock pin 67 from the review or cueing mode, only second cam follower 70 is allowed to be unlocked in response to detection of inter-feature period.

Figure 23:
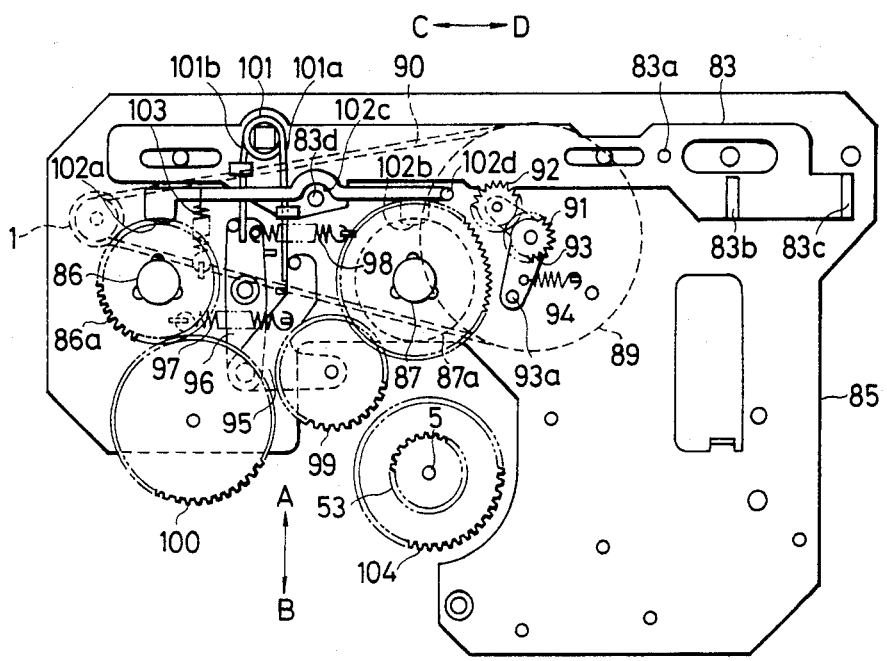
FIG. 23 is a plan view of a reel disk drive system of the mechanism shown in stop mode position.

In FIG. 23 there is shown a reel disk drive mechanism in a stop position which comprises a supply reel spindle 87 and a takeup reel spindle 88 mounted on a sub-chassis 86 located below the second drive mechanism and integrally formed with rewind and fast-forward toothed wheels 86a and 87a, respectively.

A takeup toothed wheel 88 is mounted coaxially on takeup reel spindle 87 by means of a known slip-friction mechanism to slip-frictionally drive spindle 87. A takeup pulley 89 is rotatably mounted below sub-chassis 85 and is driven by a takeup belt 90 looped around motor pulley 7. A small toothed wheel 91 is fixed to takeup pulley 89 for rotation therewith. A takeup bell crank 93 is pivotally supported on takeup pulley 89 and normally urged counterclockwise by a spring 94. Crank includes pin 93a at one arm thereof and rotatably carries at the other arm thereof a small toothed wheel 92 in mesh with toothed wheel 91 and arranged to mesh with takeup wheel 88 when bell crank 93 is rotated and disengaged therefrom when pin 93a moves counterclockwise. A bell crank 95 is pivotally mounted to one end of a gear control arm 96 and urged counterclockwise by means of a spring 97. Gear control arm 96 is rotatably supported on sub-chassis 85 and urged clockwise by a spring 98.

Figure 24:
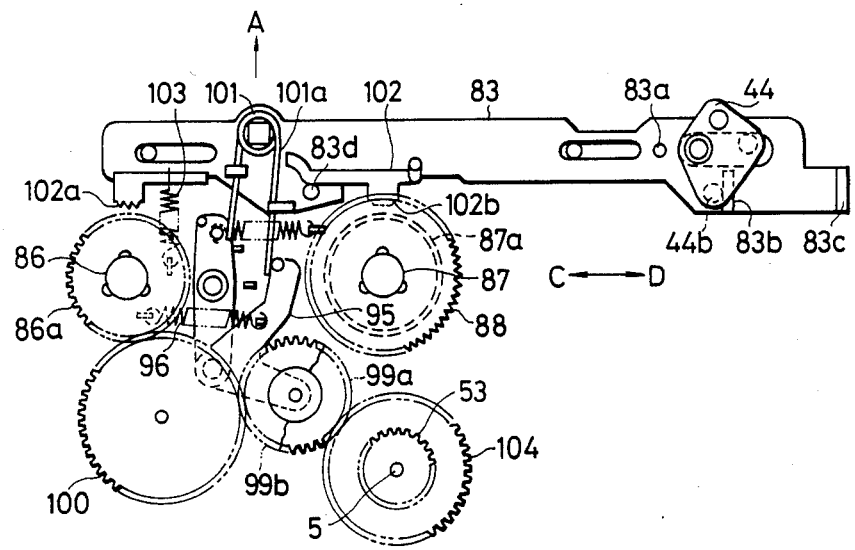
FIGS. 24 and 25 are plan views of the reel disk drive system in rewind and fast-forward mode positions, respectively.

Bell crank 95 carries at one end thereof a pair of upper and lower toothed wheels 99a and 99b (see FIGS. 24 and 25) via slip-friction means. An intermediate toothed wheel 100, rotatably mounted on sub-chassis 85, is constantly in mesh with rewind wheel 86a.

As described previously, reel disk drive member 83 is movably supported on the sub-chassis in direction C so that lugs 83b, 83c are engageable with rewind elevating lever 44 and fast-forward elevating lever 45, respectively. The reel disk drive member 83 is provided with a return spring 101 to cause wheels 99a, 99b to be displaced during rewind or fast-forward modes. This return spring 101 has opposite ends 101a and 101b biasing bell crank 95 and the gear lever 96, respectively, in opposite directions to keep them in a neutral position during other than rewind and fast-forward modes.

A brake arm 102, having at opposite ends thereof braking members 102a and 102b, is pivotally supported on sub-chassis 85 and biased by a spring 103 in a direction to permit the braking members to make contact with the reel disks respectively. Arm 102 is further formed with a cam portion 102c at an intermediate portion thereof and a pin 102d at a right end.

A second drive wheel 104 is coaxially mounted on capstan 5 below first drive wheel 53 to drive the reel disks and a release mechanism to be described later. The operation of the reel disk drive mechanism will be described with reference to FIG. 24 in which the reel disk drive mechanism is shown in a rewinding position. When REWIND lever 17 is operated, causing the, rewind mode elevating lever 44 to move downward and rotate to a pivotally displaced position, pin 44b engages lug 83b of reel drive member 83 to cause it to move in direction D.

As a result, arm 101a of spring 101 biases the bell crank 95 clockwise against spring 96 to cause lower and upper toothed wheels 99a and 99b to come into meshing engagement with second drive wheel 104 and intermediate toothed wheel 100, respectively, so that supply reel spindle 86 rotates clockwise at high speed. Brake arm 102 is pushed in direction A by pin 83d of reel disk drive member 83 so that braking members 102a and 102b are displaced from the position of contact with rewind wheel 86a and fast-forward wheel 87a, respectively.

Figure 25:
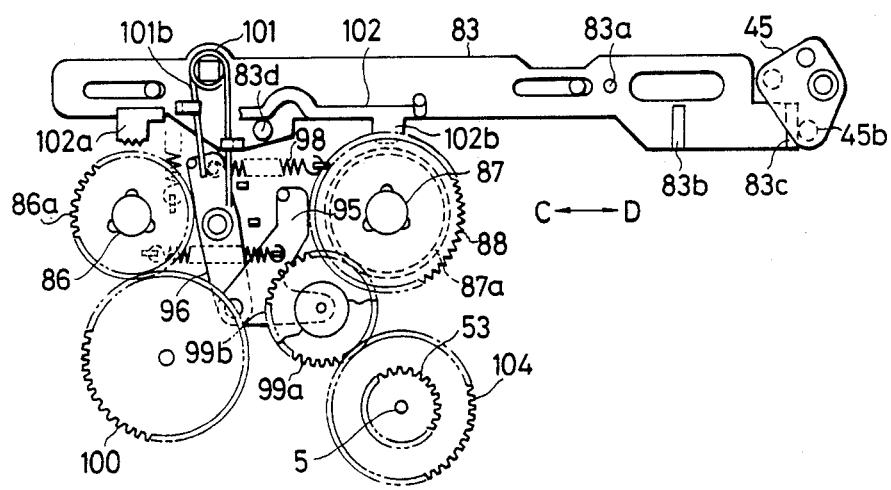

The fast-forward operation of the reel disk drive mechanism is illustrated in FIG. 25 operation of FAST-FORWARD lever 18 causes fast-forward elevating lever 45 to move downward and rotate to a pivotally displaced position so that pin 45b of lever 45 comes into engagement with lug 83c of the reel disk drive member causing it to move in direction C. As a result, left arm 101b biases gear lever 96 counterclockwise against spring 98 to reposition the lower and upper wheels 99a and 99b vertically in line with second drive wheel 104 and fast-forward wheel 87a, respectively, whereby takeup reel spindle 87 is driven in a counterclockwise direction while brake arm 102 is displaced from the braking positions.

During record and playback modes, takeup wheel 88 is driven in meshing contact with small gears 91, 92 by takeup pulley 89. Pin 93a on bell crank 93 is kicked off by pin 10c of slide base 10, as shown in FIG. 1, to disengage small gear 92 from contact with takeup wheel 88. This disengagement is also effected during other operational modes by the action of pin 93a engaging with different members depending on the modes: during rewind and fast-forward modes pin 93a is kicked off by cam portion 70h, as shown in FIG. 17, and during pause mode it is kicked off by eject lever 80 as illustrated in FIG. 19. Brake arm 102 is also displaced from the braking positions during record and playback modes by the action of rightside pin 102d engaging arm portion 10d of slide base 10 (see FIG. 1).

Figure 26:
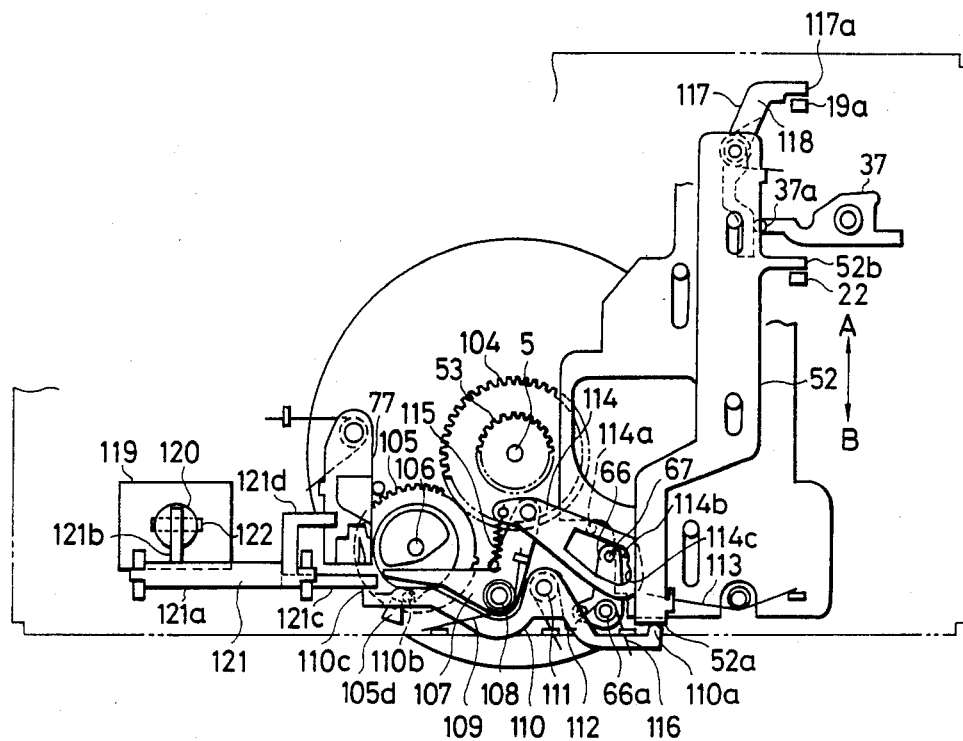
FIG. 26 is a plan view of a release system of the mechanism shown in an inoperative position.
Figure 27:
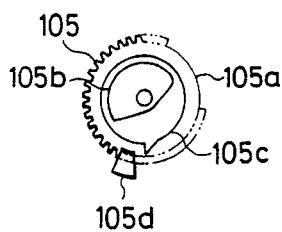
FIG. 27 is an illustration of the control wheel of the release system.

FIG. 26 is an illustration of the release mechanism of the tape recorder in an inoperative position. The release mechanism comprises a second toothed driven wheel 105. As shown in FIG. 27, second driven wheel 105 is rotatably mounted on a shaft 106 on main chassis 1 and formed with a toothless portion 105a and is provided on one surface thereof with upper and lower cams 105b and 105c and a stopper 105d. This driven wheel has a toothed portion engageable with second drive wheel 104.

A second kickoff lever or bell crank 107 is pivotally mounted on a shaft 108 and urged clockwise by a spring 109 so that its left arm is in biasing contact with upper cam 105b of second control wheel 105 to impart thereto a clockwise thrust. A second trigger lever 110 is pivotally supported on a shaft 111 on sub-chassis 85 and urged by a spring 112 in a counterclockwise direction so that its right arm 110a is in contact with third control plate 52 to prevent lever 110 from rotating on shaft 111, while a pin 110b on its left arm engages lower cam 105c to keep it out of meshing engagement with second drive wheel 104.

Third control plate 52 is biased by a return spring 113 having a greater spring force than spring 112 in direction B so that second trigger lever 110 is kept in the clockwise position of FIG. 26 against the spring. A lock release arm 114 is pivotally mounted on a pivot pin 107a on one arm of second kickoff lever 107 and formed with a downwardly extending pin 114a and an opening defined by semi-circularly contoured adjoining walls 114b and 114c and is urged in a counterclockwise direction by a spring 115 extending from its left arm portion to second kickoff lever 107 adjacent its pivot axis.

Lock lever 66 pivots at 66a and is urged clockwise by a spring 116 so that lock pin 67 engages with semi-circular wall 114b during record and playback modes and semi-circular wall 114c during automatic scan mode as will be described.

A release selection lever 117 is rotatably mounted below third control plate 52 and urged counterclockwise by a spring 118. Since the playback elevating lever 37 is in the upward, inoperative position when the release mechanism is in the position of FIG. 26, release selection lever 117 is locked in position by engagement with a pin 37a on the playback elevating lever so that a pin 111a on one end of the release selection lever is located in a position in face to face relation with pin 19a of linkage lever 19 which operates in response to operation of one of RECORD or PLAYBACK levers.

A release solenoid 119, mounted below the main chassis 1, is responsive to a signal generated by the automatic inter-feature detector.

A solenoid lever 121 is rotatable by means of a pivot shaft portion 121a mounted below main chassis 1 and includes a left arm portion 121b engaging a pin 122 which engages a plunger 120 of solenoid 119. The right arm portion 121c of lever 121 is engageable with left end portion 110c of second trigger lever 110. Solenoid lever 121 is further formed with a center arm 121d positioned in face to face relation with the upper surface of lock arm 77 used for pausing operation.

Figure 28:
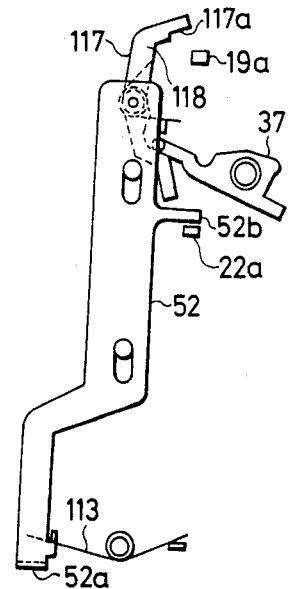
FIG. 28 is an illustration of a release selection lever in a playback mode position.

FIG. 28 is an illustration of release selection lever 117 in an operative position during playback mode in which playback mode elevating lever 37 is in the pivotally displaced downward position. In the position of FIG. 28, the release selection lever 117 rotates to a counterclockwise position via spring 118 so that pin 117a is retracted from pin 19a of linkage lever 19, whereby the release mechanism is not operated when the REWIND or FAST-FORWARD lever is operated during playback mode to permit review and cueing operation. If the REWIND or FAST-FORWARD lever is operated during recording mode, release selection lever 117 is not retracted to the position of FIG. 28 to switch the tape recorder operation from the recording mode to rewind or fast-forward mode.

Figure 29:
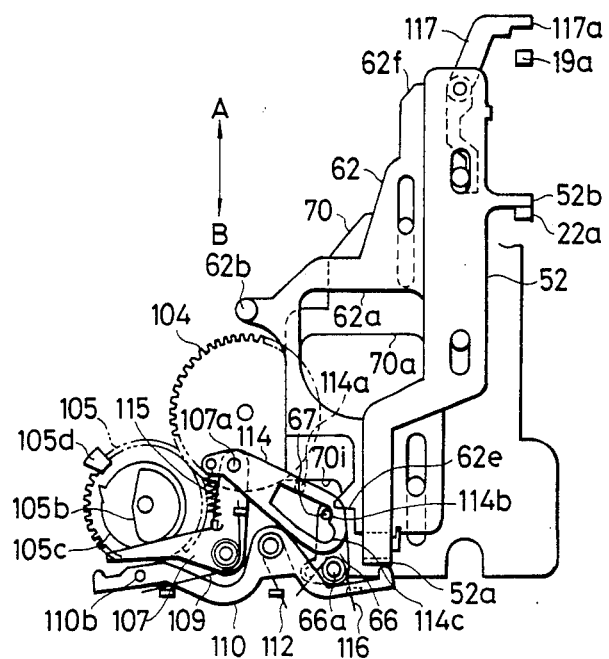
FIG. 29 is a plan view of the release system as it releases the playback mode of the mechanism.

FIG. 29 is an illustration of a release operation of the recorder from playback mode. During playback mode, first cam follower 62 is locked by engagement with lock pin 67 and second cam follower 70 is in the original position. Pin 114a of lock release arm 114 is in a clockwise position via engagement with a cam edge 70i of the second cam follower so that lock pin 67 is received in the semi-circularly contoured wall portion 114b.

In response to operation of STOP lever 22, leg 22a thereof comes into contact with third control plate 52 to cause it to move in direction A, whereby second trigger lever 110, which has been in the clockwise locked position by engagement with control plate 52, now returns to a counterclockwise position by spring 112 to unlock second control wheel 105 for rotation with driving wheel 104. As a result, upper cam 105b rotates from the position of FIG. 26 to the position of FIG. 29 causing kickoff bell crank 107 to rotate counterclockwise against spring 109. Since semi-circular wall portion 114b is located closer to the pivot point of release arm 114 than the wall portion 114a, lock pin 67 is displaced a distance sufficient to unlock first cam follower 62. Since STOP lever 22 is operated for a brief interval, third control plate 52 is returned to the original position after the stop lever has been restored and second control wheel 105 completes a 360-degree revolution until stopper 105d engages second trigger lever 110 returning to the position of FIG. 26.

Figure 30:
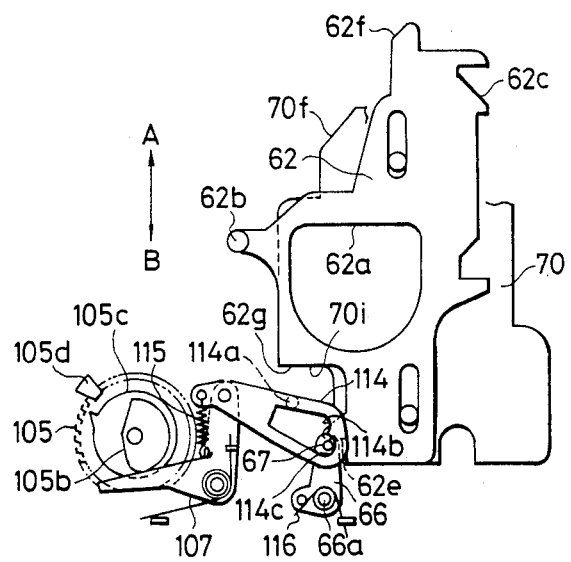
FIG. 30 is a plan view of the release system operating to release the automatic scan mode of the mechanism.

FIG. 30 is an illustration of the release mechanism operating during automatic iner-feature scan mode. Since PLAYBACK lever 21 and REWIND lever 17 or FAST-FORWARD lever 18 are simultaneously operated, first and second cam followers 62, 70 are moved in direction A and locked in position by lock pin 67. Since pin 114a of lock release arm 114 is in disengaged from cam portions 62g and 70i, the lock release arm is in a counterclockwise position by spring 115 to receive the lock pin 67 in semi-circular wall portion 114c. Therefore, when second control wheel 105 completes a 360-degree revolution in response to a release operation causing upper cam 105b to rotate second kickoff lever 107 in a counterclockwise direction, lock pin 67 is displaced a distance sufficient to unlock second cam follower 70 but insufficient to unlock first cam follower 62 to permit the tape recorder to resume the playback operation when the automatic scanning operation is accomplished.

A similar operation occurs when a known tape-end detector, not shown, is operated. In this case the tape-end detector provides a signal when the cassette tape approaches an end portion to energize solenoid 119, retracting plunger 120 to rotate solenoid lever 121 causing its right arm portion 121c to drive the second trigger lever 110 in a counterclockwise direction which will be followed by the events just described.

In summary, record and playback operations are controlled on the one hand by first cam follower 62 moved by camming contact with driven wheel 54 in response to first control plate 36 being moved to an operative position, while rewind, fast-forward and pause operations are controlled on the other hand by second cam follower 70 driven by camming contact with driven wheel 54 in response to second control plate 43 being moved to its operative position. First and second cam followers 62, 70 are unlocked by second kickoff lever 107 by engagement with second control wheel 105. Furthermore, during review, cueing and automatic scan modes the simultaneously operated keys are respectively associated with the first and second drive systems so that when the second drive system is released by the release mechanism upon the detection of an inter-feature period during automatic scan mode, for example, the first drive system is brought into action subsequent to the tape recorder being returned to the playback mode. It is to be noted therefore that the various operational modes are accomplished by separate mechanisms on a time shared basis which makes it possible to significantly reduce the amount of power needed to operate each of the function keys. Thus, the cassette tape recorder of the invention can be activated in response to a "featherly" finger touch, which is particularly advantageous for manual or automatic scan modes in which more than one key is actuated, while retaining the same operational procedures as customarily employed. Further, the separate drive mechanisms assure enhanced operational reliability and reduces the chances of error.

What is claimed is:

1. A mode switching mechanism of a cassette tape recording and reproducing apparatus having a plurality of manually operated function keys for operating the apparatus in one of recording, playback, rewind and fast-forward modes, and a motor energized in response to operation of one of said function keys, comprising:

a toothed driving wheel driven by said motor;

a driven wheel including first and second coaxially mounted cams rotatable therewith, the driven wheel having a toothed circumferential portion for engaging with the driving wheel and a toothless circumferential portion for disengaging from said driving wheel;

a spring-biased arm for pressing said first cam to urge said driven wheel into engagement with said driving wheel;

means for locking said driven wheel against said spring-biased arm when the driven wheel is disengaged from said driving wheel and unlocking said driven wheel in response to operation of a function key to allow said spring-biased arm to urge said driven wheel into engagement with said driving wheel;

a first cam follower engageable with said second cam in response to the operation of one of said recording and playback function keys;

a second cam follower engageable with said second cam in response to the operation of one of said rewind and fast-forward function keys; and a base carrying a transducer head, said base being movable upon engagement with said first and second cam followers into first and second operating positions, respectively.

2. A mode switching mechanism as claimed in claim 1, further comprising second lock means for locking said first and second cam followers in a predetermined position either in response to said cam followers being moved thereto simultaneously or in response to only one of the cam followers being moved thereto and locking only said first cam follower in said predetermined position when the movement of said second cam follower occurs subsequent to the movement of said first cam follower.

3. A mode switching mechanism as claimed in claim 1, wherein said first cam is provided with a notch portion with which the first cam engages said locking means and a cam portion with which the first cam engages said spring-biased arm.

4. A mode switching mechanism as claimed in claim 1, wherein each of said first and second cam followers is formed with a notch, further comprising spring-biased lock means engageable with each of the notches of said first and second cam followers when the first and second cam followers are moved independently of each other to the respective operative positions, each of said notches being shaped such that said lock means is engageable only with the notch of the first cam follower when said second cam follower is moved to said rewind/fast-forward position subsequent to the movement of said first cam follower to the record/playback position and engageable with both of the notches when said first and second cam followers are simultaneously moved to the respective operative positions.

5. A mode switching mechanism as claimed in claim 1 or 2, wherein said first cam is formed with a spaced apart first and second arms, said first arm being engageable with said notch in response to the operation of any one of said function keys when said driven wheel is in a first angular position and said second arm being engageable with said notch in response to the operation of one of said rewind and fast-forward function keys when said driven wheel is in a second angular position.

6. A mode switching mechanism as claimed in claim 1 or 2, wherein said tape recording and reproducing apparatus further includes a pause function key, and wherein said lock means is further responsive to the operation of said pause function key to unlock said driven wheel.

7. A mode switching mechanism as claimed in claim 1, further comprising means for energizing said motor in response to a pivotal displacement of said trigger lever and subsequently in response to movement of one of said first and second cam followers to their respective operating positions.

8. A mode switching mechanism as claimed in claim 6, further comprising:
- a pause shift lever movable upon engagement with said second cam follower to a working position when said driven wheel is unlocked in response to the operation of said pause function key for moving said head carrying base in a direction away from a tape contact position, and
- third lock means for locking said pause shift lever in said working position and preventing said second lock means from locking said second cam follower so that the same is allowed to return to a nonworking position.

9. A mode switching mechanism as claimed in claim 5, further comprising means for moving said head carrying base to a position in which said transducer head is slightly in contact with a cassette tape in response to one of said rewind and fast-forward function keys being operated subsequently to the operation of said playback function key.

10. A mode switching mechanism as claimed in claim 2, wherein said apparatus includes a stop key, and wherein said first and second cam followers have different camming contact edges respectively with which said second lock means is engageable, further comprising:
- a second driven wheel having a third coaxially mounted cam for rotation therewith, a toothed circumferential portion for engaging with said driving wheel and a toothless circumferential portion for disengaging from said driving wheel;
- a second spring-biased arm pressing said third cam for urging said second driven wheel into engagement with said driving wheel;
- a third spring-biased arm rotatably mounted on one end of said second arm and having first and second recesses located at different distances from the center of rotation of the third arm for selectively engaging with said second lock means so that the same is moved by different distances depending on which one of said recesses said second lock means is engaged when said second spring-biased arm is rotated by pressure contact with said third cam; and
- fourth lock means arranged to lock said second driven wheel in a position out of engagement with said driving wheel and arranged to unlock said second driven wheel in response to the operation of said stop key to allow said spring-biased arm to urge said second driven wheel into engagement with said driving wheel, whereby the rotation of said second driven wheel causes said second lock means to move in a direction away from said first and second cam follower along said camming contact edges by said different distances to selectively cause said first and second cam followers to return to nonworking positions.

11. A mode switching mechanism as claimed in claim 10, further comprising means including a solenoid energizable in response to an electrical control signal for causing said fourth means to move in a direction to unlock said second driven wheel, whereby the second driven wheel is driven by said driving wheel to cause said second and third spring-biased arms to move said second lock means.

12. A mode switching mechanism as claimed in claim 1, further comprising means for locking said record function key in a working position and causing said lock means to unlock said driven wheel to allow the same to engage with said driving wheel, and means for energizing said motor in response to the operation of said record function key to cause said driving wheel to rotate.

* * * * *